United States Patent [19]

Holzhausen et al.

[11] Patent Number: 4,802,144

[45] Date of Patent: Jan. 31, 1989

[54] HYDRAULIC FRACTURE ANALYSIS METHOD

[75] Inventors: Gary R. Holzhausen, Santa Cruz; William St. Lawrence, Albany, both of Calif.

[73] Assignee: Applied Geomechanics, Inc., Santa Cruz, Calif.

[21] Appl. No.: 841,645

[22] Filed: Mar. 20, 1986

[51] Int. Cl.[4] .............................................. G01V 1/40
[52] U.S. Cl. ....................................... 367/35; 367/73; 181/105
[58] Field of Search ..................... 181/105, 30; 367/25, 367/35, 73, 86; 73/155; 364/421; 166/250, 254; 175/48

[56] References Cited

U.S. PATENT DOCUMENTS

| | | | |
|---|---|---|---|
| 3,909,776 | 9/1975 | Broding et al. | 181/106 X |
| 4,271,696 | 6/1981 | Wood | 73/432.1 X |
| 4,353,244 | 10/1982 | Wood | 73/37 |
| 4,432,078 | 2/1984 | Silverman | 367/14 X |
| 4,458,245 | 7/1984 | Crosnier et al. | 181/105 X |
| 4,531,403 | 7/1985 | de Korompay et al. | 73/37 X |
| 4,671,379 | 6/1987 | Kennedy et al. | 181/106 |

OTHER PUBLICATIONS

"Fluid Transients", E Willey et al.; 1982 Times New Roman; pp. 205–259.

E. B. Wiley et al., *Fluid Transients*, FEB Press, Ann Arbor Mich 1982.

G. R. Holzhausen & H. N. Egan, "Fracture Diagnostics in East Texas and Western Colorado Using the Hydraulic-Impedance Method," presented May 18–21, 1986 at Unconventional Gas Technology Symposium of the Society of Petroleum Engineers held in Louisville, KY.

G. R. Holzhausen & R. P. Gooch, "Impedance of Hydraulic Fractures: Its Measurement and Use for Estimating Fracture Closure Pressure and Dimensions," presented May 19–22, 1985, at SPE/DOE 1985 Low Permeability Gas Reservoirs held in Denver, CO.

Bernard Chouet, "Dynamics of a Fluid-Driven Crack in Three Dimensions by the Finite Difference Method," Dec. 10, 1986, Journal of Geophysical Research, vol. 91, No. B14, pp. 13,967–13,992.

Bernard Chouet, "Ground Motion in the Near Field of a Fluid-Driven Crack and its Interpretation in the Study of Shallow Volcanic Tremor", Journal of Geophysical Research, vol. 86, No. B7, pp. 5985–6016, Jul. 10, 1981.

*Primary Examiner*—Nelson Moskowitz
*Assistant Examiner*—Tod Swann
*Attorney, Agent, or Firm*—Skjerven, Morrill, MacPherson, Franklin & Friel

[57] ABSTRACT

The growth of a hydraulic fracture increases the period of free oscillations in the well connected to the fracture. Simultaneously, the decay rate of free oscillations decreases. The properties of forced oscillations in a well also change during fracture growth. All of these effects result from the changing impedance of the hydraulic fracture that intersects the well. Hydraulic fracture impedance can be defined in terms of the hydraulic resistance and the hydraulic capacitance of a fracture. Fracture impedance can be determined directly by measuring the ratio of down hole pressure and flow oscillation or indirectly from well head impedance measurements using impedance transfere functions. Well head pressure measurements can also be used to evaluate fracture impedance by comparing them to pressure oscillations computed with hydraulic models that include fractures with different impedances. Because impedance is a function of fracture dimensions and the elasticity of the surrounding rock, impedance analysis can be used to evaluate the geometry of the fracture by analyzing the data which results from free and forced oscillations in the well, and looking for a match between the data and theoretical models of projected shapes of the fracture.

20 Claims, 5 Drawing Sheets

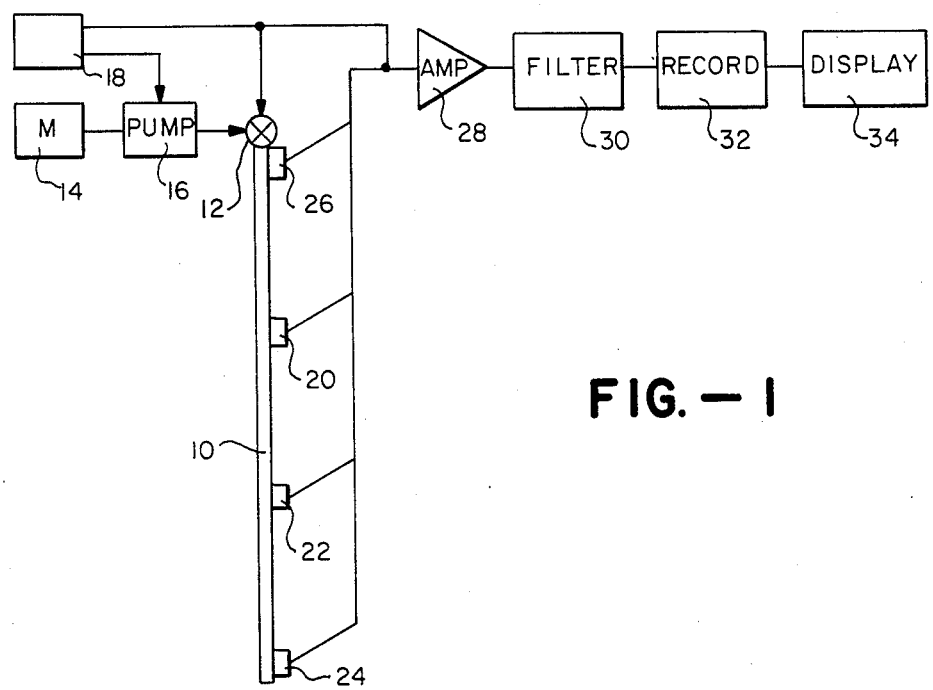
FIG. — 1
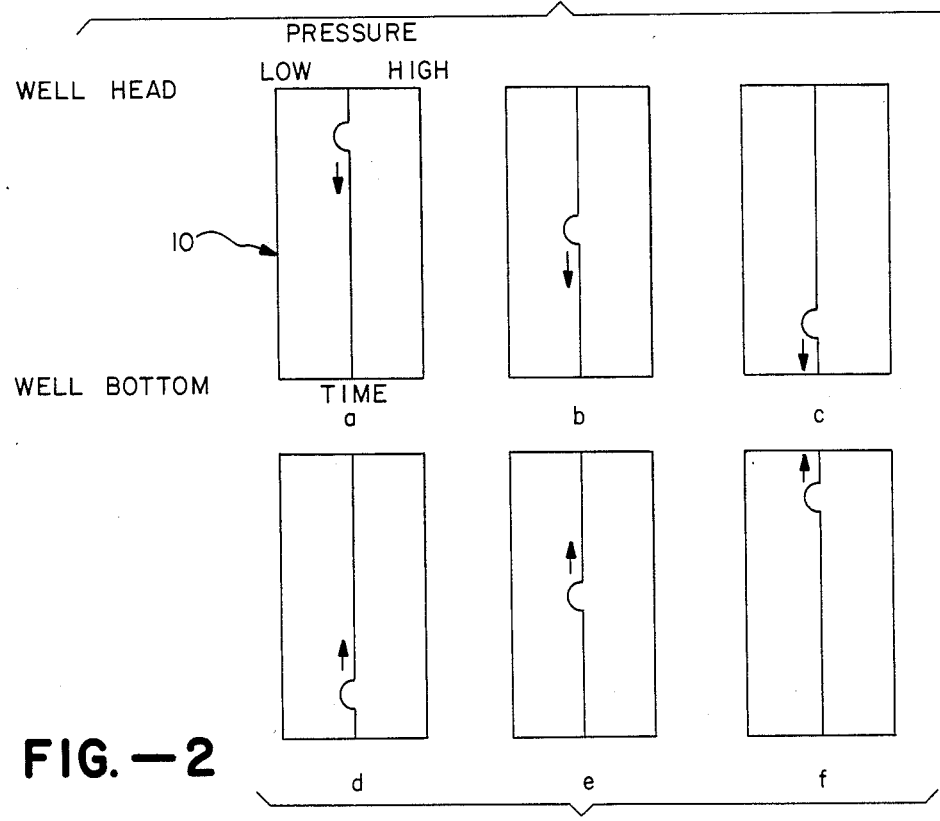
FIG. — 2

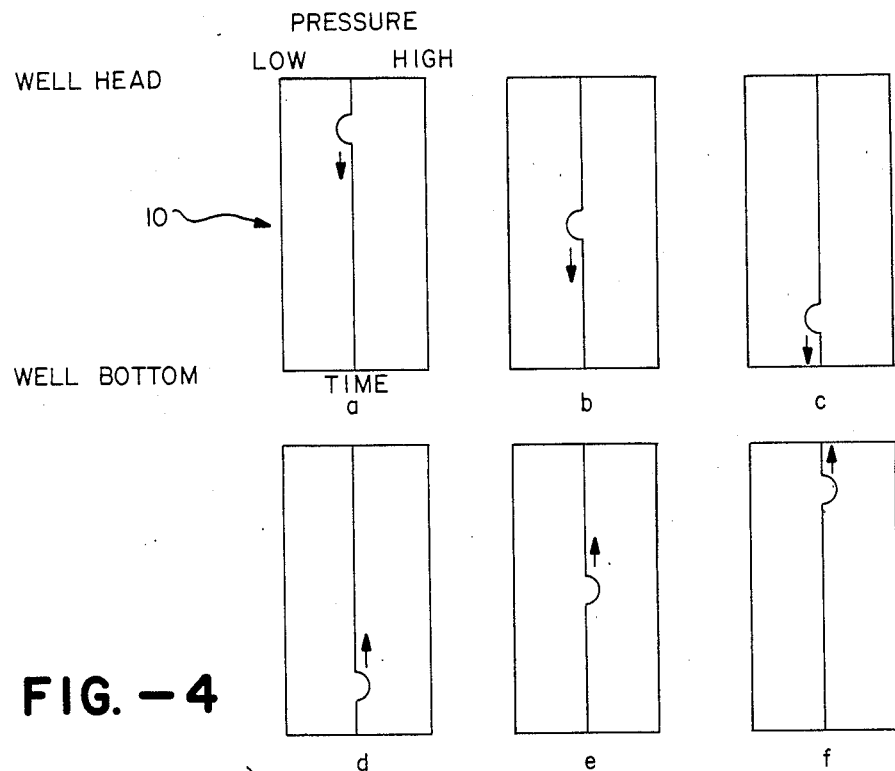
FIG.—4
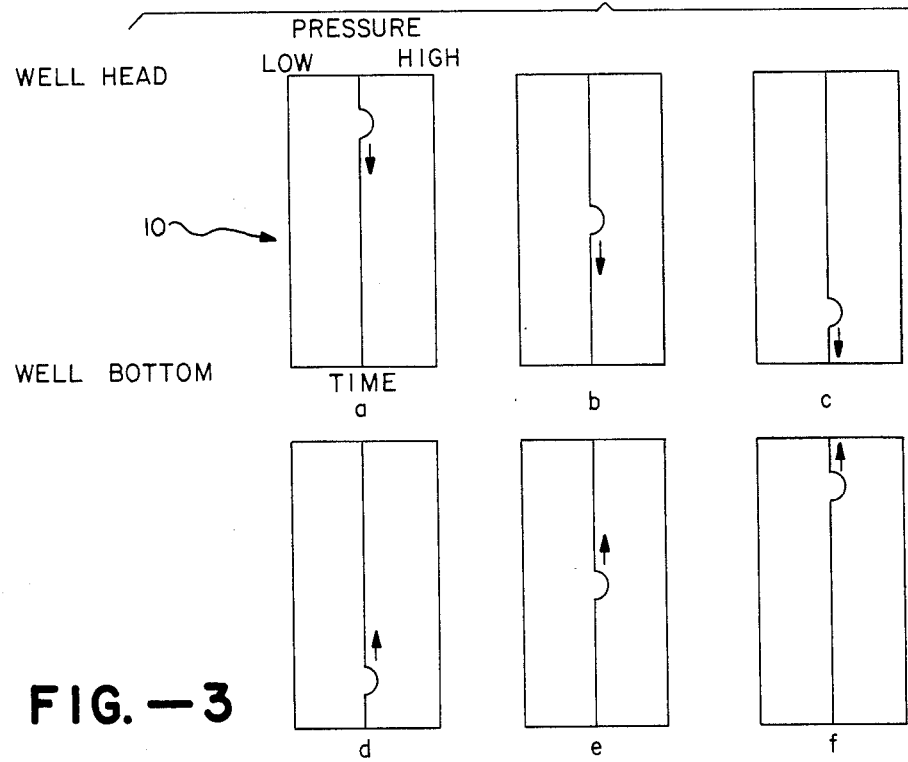
FIG.—3

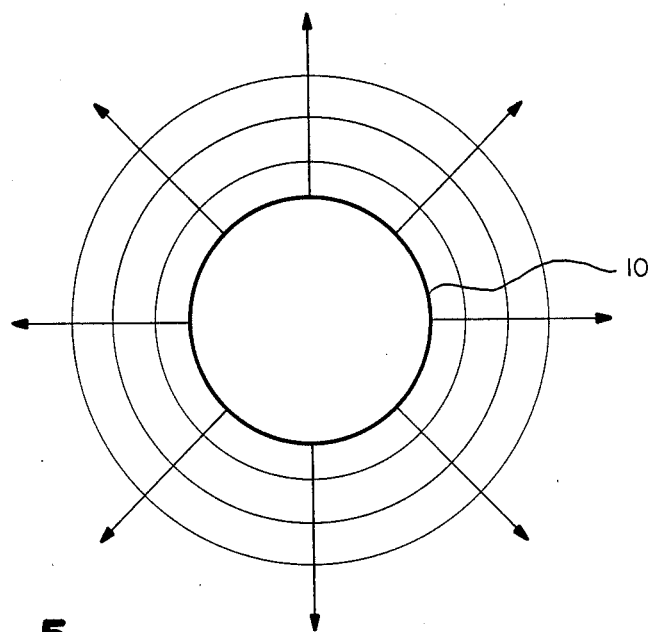
FIG.—5
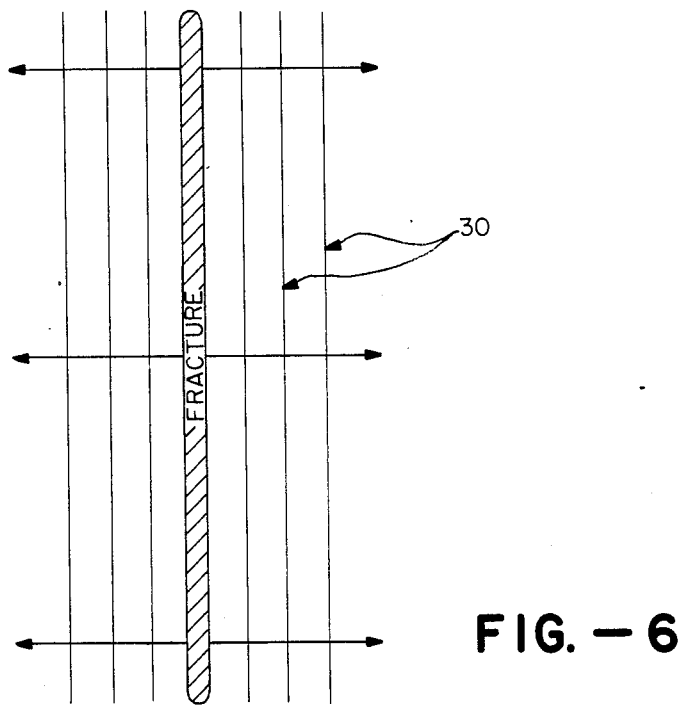
FIG.—6

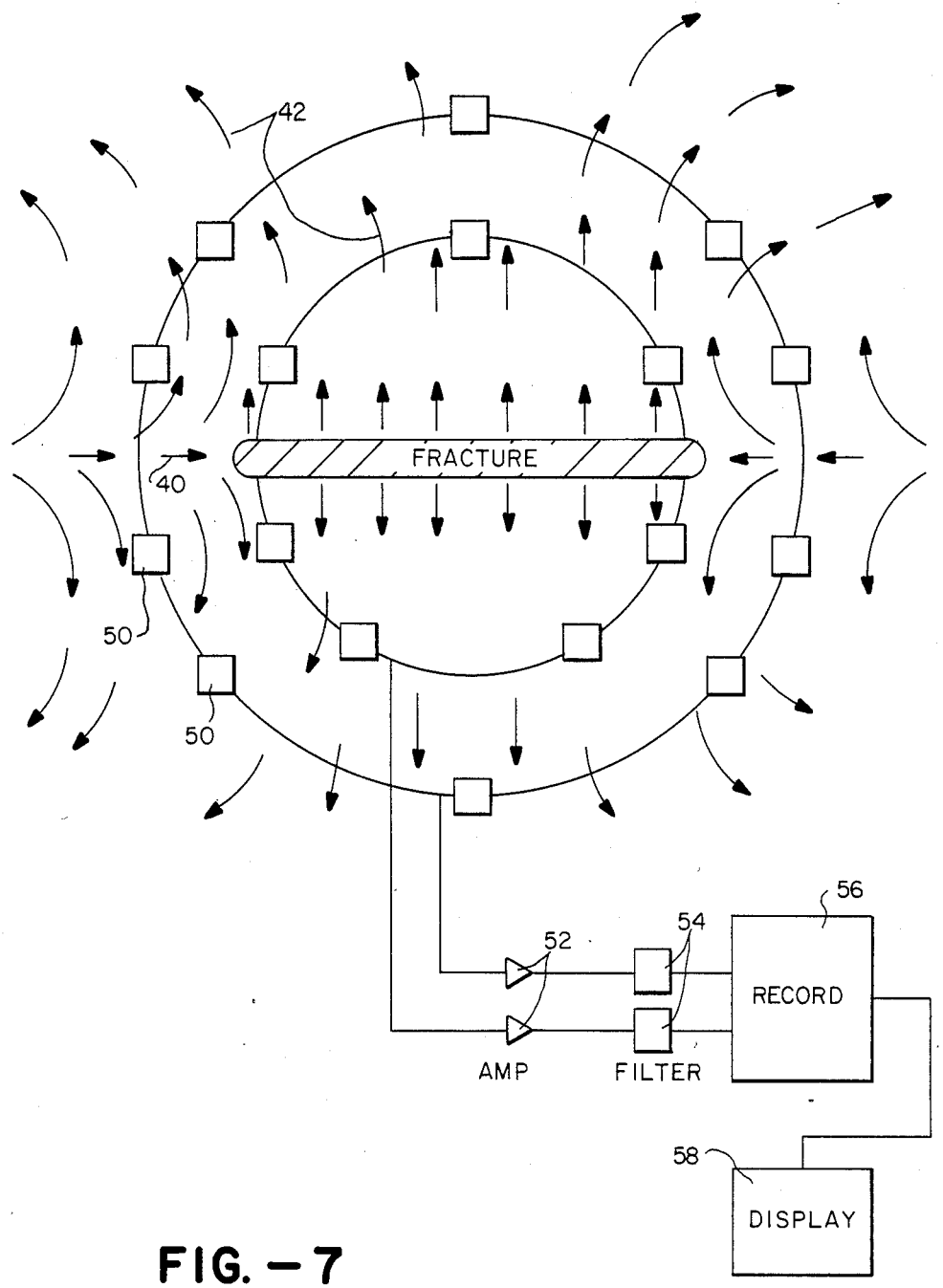
FIG. −7

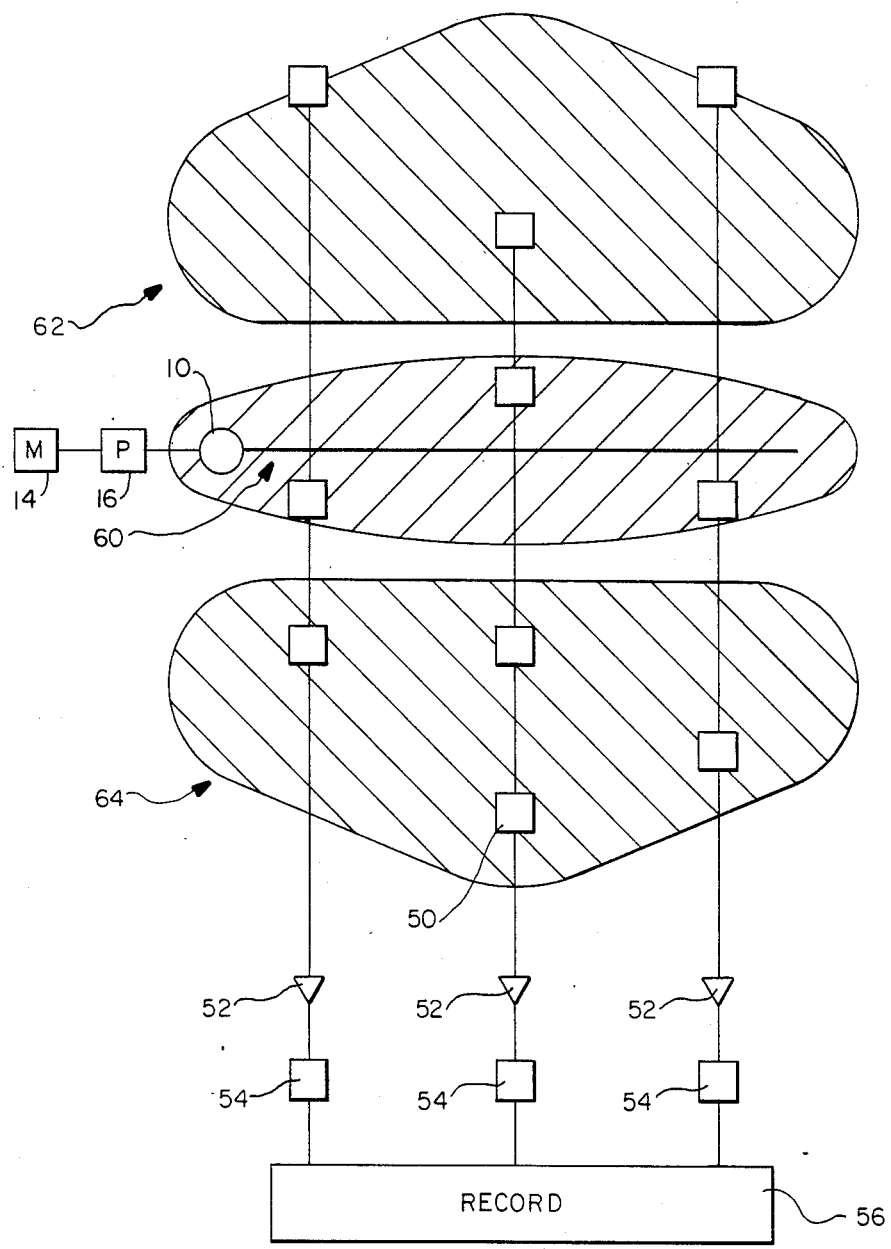
FIG. — 8

HYDRAULIC FRACTURE ANALYSIS METHOD

BACKGROUND OF THE INVENTION

This invention is in the field of determination of subsurface earth structure resulting from the application of pressurized fluid at one or more points in the earth, by the evaluation of pressure waves in a well connected to the point of application and by the evaluation of seismic earth movement. More particularly, it is concerned with determining the geometry and orientation of fractures in the earth.

Hydraulic fractures are produced in oil and gas fields, in solution mining operations, in fresh water aquifers, and certain other resource recovery operations for the purpose of extracting more fluid from the earth than is possible in wells that not have been hydraulically fractured. Hydraulic fractures are also used to more effectively disperse liquid waste into subsurface formations when these liquids are pumped into disposal wells. Generally stated, hydraulic fractures increase the hydraulic conductivity of the subsurface geologic formation, permitting greater amounts of fluid to be injected and extracted than would be the case if the fractures were not present.

Experience has shown, and it is now commonly accepted, that most hydraulic fractures are large, planar structures with surface areas from tens to many thousands of square meters. Because of their economic importance in resource recovery and waste disposal, it is often desirable to establish the orientation and, if possible, the dimensions of the fracture plane in the earth. "Geometry" and "dimensions" as used in this invention refer to the length, height and width of the fracture, where length and height are the two major axes in the plane of the fracture and width is measured perpendicular to the fracture plane. Knowledge of fracture orientation and dimensions permits wells to be drilled in optimal locations to take advantage of the non-uniform drainage or injection patterns than hydraulic fractures produce. In this way it may be possible to extract more of the resources in a field using a smaller number of wells that would be possible if fracture geometry were not known. Fracture orientation can also be used to determine the orientations of the principal stress directions in the earth around the fracture. Knowledge of stress directions in the earth is important for certain engineering purposes, such as tunneling and blasting, and in the study of regional geologic structures and earthquakes. Furthermore, information about the rate and directions of hydraulic fracture growth can be used in improving the design and production of the fractures, thereby resulting in economic savings to the individuals and organizations who use hydraulic fractures in their operations.

SUMMARY OF THE INVENTION

It is an objective of this invention to provide a process for determining the geometry of a hyraulic fracture.

It is a further objective of this invention to provide an improved method for determining the orientation of a hydraulic fracture.

The method of this invention is based on the recognition that a well connected to a fracture, both of which are filled with fluid (liquid or gas) comprises a fluid system. Steady fluid flow, by definition, is accompanied by time-invariant fluid pressure at all points in the system. For example, a fluid system at rest is at steady, or zero, flow. Excitations that occur slowly relative to the fundamental period of the fluid system induce gradual pressure variations. These slow excitations are generally not considered as producing acoustic (pressure) waves in the system or seismic wave propagation in the material surrounding the system. However, when a fluid system is abruptly disturbed, a period of transient flow results. A fluid system consisting of a well, a well and a hydraulic fracture, or a fracture alone will experience hydraulic transients when perturbed.

The known equations governing fluid transient behavior can thereby provide the basis of calculating pressure and flow oscillations at different points in the well such as at the well head. If the system boundary conditions (to be explained below) and fluid properties in the well and fracture are known, the fluid pressure oscillations can be computed with great precision. On the other hand, if the boundary conditions in the well are known, but those in the fracture (length, width, height) which is connected with the well are not known, it is possible to estimate the geometry of the fracture based on the pressure or flow oscillations measured at one or more points in the system.

Therefore, the geometry of a fracture connected to a well containing a known fluid, the fluid also having been pumped into the fracture, can be estimated in the following manner. Several models of pressure and flow oscillation are constructed using the known well geometry and a number of reasonable estimates of possible fracture geometry. The measured pressure and/or flow oscillations are then compared to those predicted by the various models. The model most closely corresponding to the measured observations is then chosen as the model representing the true geometry of the fracture in the earth. If additional accuracy and confidence in the solution is required, new models are constructed based on a geometry slightly different than the geometry of the closest original estimate, and a new comparison is made. Determination of fracture geometry in this manner is termed "solution by forward model approximation." Examples of the formulation of such models, based on analysis of closed fluid systems but which have not previously been applied to the analysis of fracture geometry, may be found, for example, in E. B. Wiley and V. L. Streeter, *Fluid Transients*, FEB Press, Ann Arbor, Mich., 1982, or the earlier edition, Wiley & Streeter, *Hydraulic Transients*, McGraw Hill Co., Chicago, Ill., 1967. D. W. Deerholt, W. R. McSpadden, *Electromagnetic Wave Propagation*, present theory which can also be used to formulate such models.

An alternative method of estimating fracture geometry for pressure of flow oscillations is to use a method known as inversion. In the inversion solution, the model that most closely resembles the observations is automatically chosen, using one of several mathematical processes already known in the literature, providing an estimate of the geometry of the fracture. Examples of the use of inversion are given by P. R. Bevington in *Data Reduction and Error Analysis for the Physical Sciences*, McGraw-Hill Book Co., 1969.

More particularly, it is known that the oscillatory energy in a pressure wave travelling in a facture deforms the elastic walls of the fracture. This oscillatory deformation induces seismic waves in the earth surrounding the fracture, and these waves radiate away from the fracture to points where they can be measured by instruments known as seismometers or geophones. Because of the flat planar shape of the fracture, energy is not radiated equally in all directions. Symmetries in the radiation field bear a consistent and predictable relationship to the symmetry of the fracture. By locating the symmetry planes in the seismic radiation field using seismic measurements, it is therefore possible to determine the orientation of the plane of the fracture.

DESCRIPTION OF THE PREFERRED EMBODIMENT

A description of the preferred embodiment of the present invention will now be related with reference to the following figures wherein FIG. 1 is a block diagram showing in elevational form the apparatus and well bore used in this invention;

FIGS. 2, 3 and 4 are examples of oscillatory motion which can be set up in a well bore using the apparatus of FIG. 1; FIG. 2 shows wave reflection at the bottom of the well for no-fracture (closed end) case, where the downgoing wave is pressure negative;

FIG. 3 shows wave reflection at bottom of well for no fracture (closed end) case, where the downgoing wave is positive pressure;

FIG. 4 shows wave reflection at the bottom of the well for the case of constant pressure at well bottom where the downgoing wave is pressure negative;

FIGS. 5 and 6 show seismic wave radiation from a well bore and from a fracture, respectively, when oscillations are set up using the equipment of FIG. 1;

FIG. 7 shows a sensor array for measuring seismic ground movements established according to FIG. 1;

FIG. 8 shows an alternative method of analyzing particle motion in the region of a fracture being studied.

As an example of hydraulic transients in a well, consider a well 10 that has a uniform diameter over its depth range and is filled with fluid under pressure as shown in FIG. 1. Such fluids used in well fracturing processes are well known in this technology. The pressure is maintained because the valve 12 at the top of the well or well head is closed, and the well is cased with an impermeable material such as steel.

Initially, the fluid system is at rest. However, if a small volume of fluid is removed from the well by rapidly opening and closing the valve, a transient condition is produced. The rapid removal of fluid causes pressure near the valve to drop below pressures elsewhere in the well 10. As fluid from below moves up to replace the lost fluid, pressure at the point from which the fluid came drops below its original value. This process is repeated down the well and in this manner, a dilatational (tensional) pressure wave is propagated from the top to the bottom of the well as shown in FIG. 2. (The dilational wave is represented as shown in FIG. 2; a compressional wave as shown in FIG. 3.) When the dilatational wave reaches the bottom of the well 10, no more upward flow is possible and in order to replace the locally depleted fluid, material must now flow downward from a point just above the bottom of the well. In this manner, the dilatational wave is propagated back up the well. When the wave again reaches the top of the well, which is closed by valve 12, it is reflected downward. In this manner, the wave travels up and down the well until it is eventually damped by fluid friction, generation of seismic radiation, and outflow of oscillatory energy from the system. The pressure oscillations taking place in the well as the wave travels up and down also displace the walls of the well 10, generating seismic waves in the surrounding rock.

Alternatively to the propagation of a dilatational or extensional wave, the initial perturbation may act to add fluid, or to compress the fluid already in the well. In this case, a compressional wave is propagated. The mechanism of wave propagation is the same as for a dilatational wave, with the exception that there is an initial pressure increase rather than a decrease, as shown in FIG. 3.

In general, it can be said that when either a dilatational or compressional wave reaches the end of a well that is closed, it is reflected with a positive reflection coefficient; i.e., a dilatational wave is reflected as a dilatational wave and a compressional wave is reflected as a compressional wave. In contrast, if the lower end of the well 10 is open so that fluid can flow in or out as the wave travels to the end and is reflected, and if the pressure at the lower end is held constant, for example, by connecting this end to a large reservoir at constant hydraulic head, the wave will be reflected with a negative reflection coefficient. That is, an initially compressional wave will be reflected as a dilatational wave and vice versa as shown in FIG. 4.

The above description applies to the case of wells with a closed end (no flow) or constant pressure at the bottom end. If a hydraulic fracture has been made by pumping fluid into the well until the rock near the subsurface injection point fractured, using for example the motor 14 and pump 16 shown connected to valve 12 and controlled by control system 18, the energy contained in a transient pressure wave travelling in the well will penetrate the fracture when the wave passes the well-fracture intersection point. This energy, in the form of a pressure wave traveling in the fracture, will have a tendency to propagate to the end of the fracture where it will then be reflected back toward the well. When the wave reaches the well 10, energy will then be transmitted up the fluid column in the well bore toward the surface. Thus, the wave pattern detected by pressure sensors at the well head or elsewhere in the well will be different when a hydraulic fracture is present than when no hydraulic fracture is present. The particular shape of the wave pattern will depend on fracture dimensions. In fact, for a given well geometry and fluid in the well-fracture hydraulic system, there will be a distinct wave pattern or pressure history associated with every hydraulic fracture geometry.

Therefore, in accordance with the present invention, by proper analysis of oscillations or wave pattern or pressure history set up by creation of an oscillation in the well bore connected with the fracture, the geometry of a fracture which would have created the measured wave pattern may be measured. The wave pattern itself may be measured using a plurality of sensors 20, 22, 24 located at varying points in the well or sensor 26 located at the well head. The outputs are properly amplified 28, filtered 30 and recorded 32 for an analysis according to the well-known theory of closed system fluid transients incorporated by reference above, and the results displayed at display 34. Filtering is carried out to remove instrument noise and enhance the signals used in the subsequent analysis. Standard filtering techniques well known in geophysics and electrical engineering can be used. Generally, pressure and flow oscillations of the type described above are functions of the geometry of the well fracture system (boundary conditions), the physical properties of the rocks surrounding the well and fracture, the physical properties of the fluid, and the location and form of the excitation. The physical laws that describe the flow fluid in a conduit are the conservation of momentum and the conservation of mass, which are:

$$g \frac{\partial H}{\partial x} + \frac{Q}{A^2} \frac{\partial Q}{\partial x} + \frac{1}{A} \frac{\partial Q}{\partial t} + F(Q) = 0 \quad (1)$$

$$\frac{\partial H}{\partial t} + \frac{a^2}{gA} \frac{\partial Q}{\partial x} + \frac{Q}{A} \frac{\partial H}{\partial x} - \frac{Q}{A} \sin\alpha = 0 \quad (2)$$

Where H is the pressure head in meters and Q the volumetric flow rate (meters$^3$ per second) are the dependent variables; A is the cross-sectional area of the conduit (m$^2$); F(Q) is a frictional loss function dependent on fluid viscosity, conduit size, shape and roughness, $\alpha$ is the angle of the conduit with the horizontal; x is linear distance along the conduit; g is acceleration due to gravity; a is the pressure wave speed in the fluid; and t is time. These quasi linear hyperbolic equations together with the appropriate boundary and initial conditions can be solved numerically; the constants are all specifically found in the Wiley and Streeter references incorporated above, or can be determined at the time an analysis of a specific well-fracture system is performed.

The equations assume that the conduit material behaves elastically. If the elastic assumption cannot be made, a stress-strain model describing conduit material behavior is required, and the corresponding fluid dynamic model exhibits increased damping.

The equations governing fluid transient behavior from the basis of calculating pressure and flow oscillations at different points in the well such as at the well head. If the system boundary conditions and fluid properties are known, the fluid pressure oscillations can be computed with great precision. On the other hand, if boundary conditions in the well are known, but those in the fracture (e.g., fracture width, length, height) are not known, it is possible to estimate the geometry of the fracture based on the pressure or flow oscillation measured at one or more points in the system. This solution is provided by either forward model approximation or inversion as described above.

The necessary parameters to make this calculation are as follows:

1. Know the properties including wave speed and viscosity of the fluid in the well bore 10 and in the associated fracture.

2. Know the elastic properties of the material surrounding the fracture; that is, the elastic properties of the rock strata through which the fracture has propagated. This can be done by appropriate drilling, logging and/or rock sample analysis as is well known in this technology.

3. Know the geometry of the well completion and the location of the points of fluid flow from the well into the fracture. These, for example, might be the locations of perforations in the well casing or the location of the uncased portion of the well. Location of the sensors 20, 22, 24 at these points would be appropriate but is not necessary for operation of the invention.

4. Perturb the fluid in the well bore to create transient pressure and flow conditions in the well according to a known pattern. The perturbation can be produced by rapidly removing a slug of fluid from the pressurized well by opening and closing valve 12; rapidly injecting a slug of fluid in valve 12; or by the continuous oscillatory action of one or more reciprocating pumps 16.

5. Measure the transient fluid behavior with pressure transducers and/or flow meters at the well head or in the well 20, 22, 24, 26.

6. Using mathematical models, find the hydraulic fracture geometry that best explains the measured pressure and flow oscillations.

The previous paragraphs have described a method for estimating hydraulic fracture geometry (height, width and length) from fluid pressure or flow oscillations measured at one or more points in a well. It is also possible to use fluid transient behavior and analysis to determine the orientation of a hydraulic fracture in the earth.

The oscillatory energy in a pressure wave traveling in a well bore or fracture deforms the elastic walls of these conduits. As the pressure along a portion of the boundary between fluid and solid fluctuates between higher and lower values, the conduit alternately expands and contracts. This oscillation sets up elastic pressure waves (seismic waves) in the rocks surrounding the conduit, either well or fracture. An example of pressure transients in an underground conduit setting up seismic waves is provided by events on the Edward Hyatt Power Plant under Oroville Dam, Calif. June 17, 1976. On that date, the water in penstock #1 experienced auto-oscillation as a result of valve malfunction. That is, transient flow conditions developed in the penstock, accompanied by the passage of high-amplitude pressure waves from one end of the penstock to the other. A seismometer in the area recorded seismic ground motion that began at the onset of the oscillations in the penstock and stopped abruptly several hours later with their cessation.

When seismic energy is generated by the pressure oscillations in a long cylindrical circular conduit such as well 10, it radiates away from the conduit in a radially symmetric pattern such as shown in FIG. 5. However, when the conduit has a significantly different shape, such as the flat tabular shape of a hydraulic fracture, the radiation pattern is not radially symmetric. Near the fracture, seismic waves radiate away as plane waves that are parallel to the sides of the fracture shown in FIG. 6.

As the wave front 30 moves away from the fracture, its amplitude and geometry becomes more complicated. It never attains a radially symmetric shape and can therefore always be distinguished from a wave front generated by fluid pressure oscillations in a circular and cylindrical well bore. However, the seismic wave pattern emanating from the fracture does have a distinct symmetry that is related to the orientation of the fracture plane. It is by detection of this distinctive wave pattern according to this invention that a determination of the orientation of the hydraulic fracture in the earth may be accomplished.

When speaking of the wave pattern about the hydraulic fracture, it is useful to visualize particle motions in the earth that the seismic waves produce. Particle motion is defined as the movement that an individual particle of material experiences as seismic wave pass through a given point. FIG. 7 illustrates, with vectors 40 pointing toward the fracture and vectors 42 pointing away from the fracture, the particle motion in a plane perpendicular to a hydraulic fracture that has experienced a sudden uniform pressure increase resulting from the propagation of a transient pressure wave into the fracture. Sudden pressure increases of this type may be created in any of the several ways discussed above. The position of the plane is not important because qualitatively the same pattern of particle motion will occur regardless of the distance of the plane from the nearest edge of the fracture. Thus, measurement of the relative particle motion can always be used to determine the orientation of the fracture plane.

It should be noted that the vectors indicating particle motion in FIG. 7 indicate first motion due to the seismic wave set up by sudden pressure increase in the fracture. If the fracture pressure had undergone a sudden decrease, the first particle motions would be in the opposite direction to those shown.

It can be seen from FIG. 7 that particle motions in the area perpendicular to the fracture plane are principally away from the fracture. Particle motions in the area beyond the ends of the fracture as represented by vectors 40 are principally toward the fracture. Furthermore, the vectors 42 moving away from the fracture are considerably longer than those moving toward the fracture, i.e., they represent greater particle motions. These differences form the basis for determining the fracture orientation. The greater the precision with which relative particle motions around the fracture can be determined, the greater the accuracy in identifying the orientation of the fracture in the earth.

It should also be noted that determination of fracture orientation is not dependent on determination of first particle motion only. As transient pressure waves cause pressure in the fracture to oscillate, the resulting pattern of oscillation of particles at points around the fracture will also bear a distinct relation and symmetry to fracture orientation. Thus, fracture orientation can be determined by measurements of first particle motion or the entire time history of particle motion resulting from seismic waves radiating from the fracture. By placement of sensors 50 in a known pattern in the region where the fracture is assumed to exist, and taking readings from these sensors, amplifying these in 52, filtering them at 54 and recording the data for analysis at 56, an estimate of the orientation of the fracture can be made.

The discussion above has been directed to analysis of particle motion parallel to a plane that is perpendicular to the fracture plane. For example, where the fracture plane is vertical as shown in FIG. 7, the particle motions could be the horizontal motions in a plane that is also horizontal. However, it is also possible to analyze particle motions in a plane that is not perpendicular to the fracture plane. Furthermore, the seismic waves generated by pressure oscillations in the fracture also cause particle motion in the direction perpendicular to the measurement plane. A typical case is vertical particle motion at the earth's surface, as illustrated in FIG. 8. These particle motions also have a distinct symmetry in relation to the orientation of the fracture which may be detected by sensors 50, analyzed and amplified 52, filtered 54 and recorded 56. For example, if the onset of pressure oscillation of the fracture is a pressure increase, the fracture will suddenly widen. This widening causes compressional waves to radiate away from the fracture in all directions. However, directly above and below the fracture, dilatational (extensional) waves are radiated. When these waves meet the horizontal surface above the fracture on which the measurements are made, the first particle motion is downward directly above the fracture. To either side of the fracture plane the first particle motion is upward.

This qualitative pattern of vertical particle motion is illustrated in FIG. 8. It can be seen that the area of downward motion is an elongated trough generally indicated at 60, whose long axis is parallel to the strike or azimuth of the fracture plane. There are two principal areas of upward first particle motion. These areas indicated generally at 62, 64 flank the elongated trough above the fracture. Thus, by measuring the vertical particle motion above the expected location of the fracture and differentiating between the areas of upward and downward first particle motion, or by determining the elongation of the trough above the fracture, it is possible to establish the orientation of the underlying hydraulic fracture. The same procedure may be used to determined fracture orientation when the seismic particle motion is caused by sudden pressure decrease. In the latter case, the first motions have the opposite sense from that shown in FIG. 8. That is, there is an initial elongate uplift above the fracture and simultaneous down-dropping in areas flanking the uplift zone. Thus it is possible to determine fracture orientation using the inventive method regardless of whether the first pressure oscillation in the fracture causes a pressure increase or decrease. Furthermore, as the transient pressure waves in the hydraulic fracture cause pressures to oscillate, the seismic field surrounding the fracture also oscillates. The resulting pattern of vertical particle motion at all points surrounding the fracture bears a distinct relationship and symmetry to the orientation of the fracture plane. Thus, fracture orientation can be determined from analysis of either first particle motion or a longer time history of particle motion.

It should also be noted that determination of fracture orientation can be made from measurements of particle motions in three dimensions as well as the separate analysis of horizontal or vertical particle motions.

The description above is directed to determination of strike (azimuth) of vertical fractures from seismic particle motion that pressure waves in the fracture produce. However, the same methods of measurement and analysis apply to fractures of any orientation. Essentially, particle motions are measured then compared to patterns of particle motion than fractures with different orientations would be expected to produce. The expected particle motions are those that can be calculated using well-known theories of seismic wave propagation such as those in J. E. White, *Underground Sound*, Elsevier (1983) and Bernard Chouet, "Ground Motion in the Near Field of a Fluid-Driven Crack and Its Interpretation in the Study of Shallow Volcanic Tremor," *Journal of Geophysical Research*, pp. 5985–6016 (1981).

It is important that the mathematical techniques used satisfy the widely published physical laws of seismic wave propagation. This approach can be used to estimate the strike or azimuth of a vertical fracture, and can also be used to determine the dip from horizontal and strike of nonvertical fractures. If the measured seismic motions do not correspond to those that a vertical fracture would produce, then they are compared to those expected from fractures of other orientations. The analytical technique for this comparison can be either the forward model approximation or inversion defined above.

In summary, to estimate hydraulic fracture orientation and seismic ground motion, it is necessary to position the array of sensors 50 around the estimated region of the fracture. The sensors may be geophones, seismometers, accelerometers, tiltmeters or other devices capable of measuring ground motion to the desired precision and accuracy. Next, fluid pressure or flow oscillations must be induced in the fracture by sudden perturbation in the fluid in the well bore 10. Next, seismic ground motions are measured with the sensors 50 and motions caused by sources other than the fracture are removed by filters 54.

Next, the seismic ground motion that the induced pressure and flow oscillation will produce is calculated using theories of seismic wave propagation.

Next, the measured ground motion (after filtering to remove noise) is compared to theoretical predictions, leading to a selection of the fracture orientation that best corresponds to the measured ground motion.

Modifications to the present invention may become apparent to a person of skill in the art who studies this invention disclosure. For example, other methods of perturbing the fluid such as by introducing an air gun or water gun or the like into the wellbore to produce pressure waves in the fluid could also be utilized. Therefore, this invention is to be limited only by the claims which follow.

What is claimed:

1. A method of determining the geometry of a hydraulic fracture in the earth communicating with the surface of the earth through a well bore or the like comprising the steps of
   (a) perturbing fluid in the well bore to induce oscillation in a fluid in said well bore, said oscillation extending to the surface of the well bore,
   (b) measuring the resulting pressure oscillations at at least one point in the well bore,
   (c) calculating the theoretical shape of the fracture in the earth based on the oscillations detected in the well bore.

2. A method as in claim 1 including the step of providing a source of oscillations at the surface of the well bore.

3. A method as in claim 1 including the step of providing a plurality of sources of oscillations within the well bore.

4. A method as in claim 1 wherein said calculating step comprises calculating the theoretical oscillations that would result at that measurement point from the applied perturbation from a reasonable estimation of the fracture shape, and
   comparing the measured pressure oscillations with the theoretically calculated oscillations to estimate the shape of the fracture.

5. A method as in claim 4 including the step of determining the geometric growth of a hydraulic fracture by repeated application of the method of claim 4 and comparing the estimate of fracture shape and dimension with the measurement of actual oscillations.

6. A method as in claim 4 wherein theoretical oscillations are calculated for a variety of reasonable fracture shapes, and the fracture shape is selected which yields pressure or flow oscillations most closely resembling the measured pressure or flow oscillations as the best approximation of the true shape and dimensions of the hydraulic fracture in the subsurface.

7. A method as in claim 6 including the step of determining the growth of a hydraulic fracture by repeated application of the method of claim 4 and comparing the estimate of fracture shape and dimension with the measurement of actual oscillations.

8. The method of claim 1 and further comprising the step of perturbing fluid in the well bore to induce oscillation in a fluid in said well bore, said oscillation extending to the bottom of the well bore.

9. A method of estimating hydraulic fracture geometry from transient pressure oscillations in a well bore, comprising the steps of
   providing a well bore in communication with the fracture region to be examined,
   determining properties of a fluid in the well bore or fracture which influence oscillatory response of the fluid,
   determining geometry of the well bore and location of potential fluid flow from the wall into the fracture,
   perturbing the fluid in the well bore to create transient pressure and flow in the well bore extending to the surface of the well bore,
   measuring the transient fluid behavior of the fluid in the well bore,
   estimating the hydraulic fracture geometry that best explains the measured pressure or flow oscillations.

10. A method as in claim 9 in which the property determining step includes the step of determining the wave speed and viscosity of the fluid.

11. A method as in claim 9 wherein the perturbation is produced by rapidly removing a slug of fluid from the pressured well bore.

12. A method as in claim 9 wherein the perturbation is caused by rapidly injecting a slug of fluid in the well bore.

13. A method as in claim 9 wherein the perturbation is caused by oscillatory action of reciprocating pumps.

14. A method as in claim 9 including the step of measuring the transient fluid behavior at the well head.

15. A method as in claim 9 including the step of measuring the transient fluid behavior in the well.

16. A method as in claim 9 and further comprising the step of perturbing the fluid in the well bore to create transient pressure and flow in the well bore extending to the bottom of the well bore.

17. A method of determining the orientation of a hydraulic fracture plane in the earth comprising
   positioning an array of sensors for measuring seismic ground motion above a region which includes the fracture,
   providing a well bore having fluid therein communicating with the fracture to be defined,
   perturbing the fluid to cause transient pressure or flow oscillations in the fluid column in the well bore,
   measuring seismic ground motion induced by the transient pressure and flow oscillations in the fracture,
   calculating, using theory of wave propagation, the ground motion expected of fractures of different orientations,
   comparing the measured ground motion with the calculated ground motion patterns representing fractures of different orientations,
   selecting the fracture orientation that yields calculated seismic ground motions must closely resembling the measured seismic ground motions as the most probable fracture orientation, and
   calculating a probable fracture orientation based on the seismic motion of the ground;
   wherein the measuring step includes the step of measuring particle motion in a plane that is not perpendicular to the fracture plane, and wherein only first motion or particles is measured in said measuring step.

18. A method as in claim 17 wherein the measurement step includes measuring particle motions in a horizontal plane, the particle motion to be measured being upward and/or downward.

19. A method of determining the orientation of a hydraulic fracture plane in the earth comprising positioning an array of sensors for measuring seismic ground motion above a region which includes the fracture, providing a well bore having fluid therein communicating with the fracture to be defined, perturbing the fluid to cause transient pressure or flow oscillations in the fluid column in the well bore, measuring seismic ground motion induced by the transient pressure and flow oscillations in the fracture, calculating, using theory of wave propagation, the ground motion expected of fractures of different orientations, comparing the measured ground motion with the calculated ground motion patterns representing fractures of different orientations, selecting the fracture orientation that yields calculated seismic ground motions most closely resembling the measured seismic ground motions as the most probable fracture orientation, and calculating a probable fracture orientation based on the seismic motion of the ground, wherein the measuring step includes the step of measuring particle motion in a plane that is not perpendicular to the fracture plane, and wherein the measuring step measures the history of oscillatory particle motion, and said calculating step studies the symmetry of oscillatory particle motion.

20. A method of determining the orientation of a hydraulic fracture plane in the earth comprising positioning an array of sensors for measuring seismic ground motion above a region which includes the fracture, providing a well bore having fluid therein communicating with the fracture to be defined, perturbing the fluid to cause transient pressure or flow oscillations in the fluid column in the well bore, measuring seismic ground motion induced by the transient pressure and flow oscillations in the fracture, calculating, using theory of wave propagation, the ground motion expected of fractures of different orientations, comparing the measured ground motion with the calculated ground motion patterns representing fractures of different orientations, selecting the fracture orientation that yields calculated seismic ground motions most closely resembling the measured seismic ground motions as the most probable fracture orientation, and calculating a probable fracture orientation based on the seismic motion of the ground, wherein the measuring step includes the step of measuring particle motion in a plane perpendicular to the fracture plane, wherein the measuring step measures the history of oscillatory particle motion, and said calculating step studies the symmetry of oscillatory particle motion, and wherein the fracture to be studied is vertical, and the particle motions are horizontal in a plane that is also horizontal and perpendicular to the fracture.

* * * * *

UNITED STATES PATENT AND TRADEMARK OFFICE
CERTIFICATE OF CORRECTION

PATENT NO.   : 4,802,144
DATED        : January 31, 1989
INVENTOR(S)  : Gary R. Holzhausen and William St. Lawrence It is certified that error appears in the above-identified patent and that said Letters Patent is hereby corrected as shown below:

Title page, line [57], delete the entire ABSTRACT and insert the following:

ABSTRACT

Hydraulic fractures are produced in oil and gas reservoirs, salt deposits, ground water aquifers and other subsurface formations in order to enhance production of fluids from the earth. The geometry of a hydraulic fracture is determined by generating pressure waves in a well that is hydraulically connected to the fracture. Hydraulic fracture height, width and length are then estimated from the measured pressure waves by comparing them to the oscillatory behavior predicted by different mathematical models. The model that most closely corresponds to the measured data is chosen as representative of the hydraulic fracture in the earth.

Signed and Sealed this

Third Day of November, 1992

Attest:

DOUGLAS B. COMER

*Attesting Officer*   Acting Commissioner of Patents and Trademarks